(12) United States Patent
Choi et al.

(10) Patent No.: US 9,804,637 B2
(45) Date of Patent: Oct. 31, 2017

(54) PORTABLE DISPLAY DEVICE

(71) Applicant: SAMSUNG DISPLAY CO., LTD., Yongin, Gyeonggi-Do (KR)

(72) Inventors: Dong-wook Choi, Hwaseong-si (KR); Minjae Kim, Yonginsi (KR); Sun A Yang, Suwon-si (KR); Jongho Chong, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 96 days.

(21) Appl. No.: 14/606,573

(22) Filed: Jan. 27, 2015

(65) Prior Publication Data

US 2016/0048168 A1    Feb. 18, 2016

(30) Foreign Application Priority Data

Aug. 14, 2014  (KR) .................. 10-2014-0106129

(51) Int. Cl.
    *G06F 1/16*        (2006.01)
(52) U.S. Cl.
    CPC .......... *G06F 1/1641* (2013.01); *G06F 1/1616* (2013.01); *G06F 1/1652* (2013.01); *G06F 1/1683* (2013.01)
(58) Field of Classification Search
    CPC ...... G06F 1/1652; G06F 1/1641; G06F 1/188; H04M 1/0268; H04M 1/0277; H04M 1/72569; H04M 2250/22
    See application file for complete search history.

(56) References Cited

U.S. PATENT DOCUMENTS

| | | | | |
|---|---|---|---|---|
| 2010/0064244 A1* | 3/2010 | Kilpatrick, II | ........ | G06F 1/1616 715/773 |
| 2013/0169515 A1* | 7/2013 | Prushinskiy | .......... | G06F 1/1652 345/55 |
| 2014/0153266 A1* | 6/2014 | Kim | .................... | H04M 1/0268 362/418 |
| 2016/0035759 A1* | 2/2016 | Kwon | ................. | H01L 27/1244 257/40 |

FOREIGN PATENT DOCUMENTS

| | | | |
|---|---|---|---|
| KR | 10-2006-0009052 A | 1/2006 |
| KR | 10-2006-0028947 A | 4/2006 |
| KR | 10-2007-0036904 A | 4/2007 |
| KR | 10-2009-0077227 A | 7/2009 |
| KR | 10-2010-0058416 A | 6/2010 |
| KR | 10-2011-0005749 A | 1/2011 |

* cited by examiner

*Primary Examiner* — Gerald Johnson
(74) *Attorney, Agent, or Firm* — Lee & Morse, P.C.

(57) ABSTRACT

A portable display device including a display unit, the display unit including a light-emitting surface that displays an image and a non-light-emitting surface opposite to the light-emitting surface; a drive unit, the drive unit controlling the display unit; and a flexible film, the flexible film electrically connecting the display unit and the drive unit, wherein the drive unit includes a first surface on which the flexible film is disposed, and a second surface opposite to the first surface, and wherein the portable display device is embodied in a first folding mode in which the flexible film is bent in such a way that the non-light-emitting surface and the second surface face each other, or a second folding mode in which the flexible film is bent in such a way that the light-emitting surface and the first surface face each other.

14 Claims, 6 Drawing Sheets

PORTABLE DISPLAY DEVICE

CROSS-REFERENCE TO RELATED APPLICATION

Korean Patent Application No. 10-2014-0106129, filed on Aug. 14, 2014, in the Korean Intellectual Property Office, and entitled: "Portable Display Device," is incorporated by reference herein in its entirety.

BACKGROUND

1. Field

Embodiments relate to a portable display device.

2. Description of the Related Art

Due to the rapid development of portable display devices, application areas thereof are getting wider, e.g., watching satellite broadcasting or playing games as well as telephone conversation or scheduling.

SUMMARY

Embodiments are directed to a portable display device.

The embodiments may be realized by providing a portable display device including a display unit, the display unit including a light-emitting surface that displays an image and a non-light-emitting surface opposite to the light-emitting surface; a drive unit, the drive unit controlling the display unit; and a flexible film, the flexible film electrically connecting the display unit and the drive unit, wherein the drive unit includes a first surface on which the flexible film is disposed, and a second surface opposite to the first surface, and wherein the portable display device is embodied in a first folding mode in which the flexible film is bent in such a way that the non-light-emitting surface and the second surface face each other, or a second folding mode in which the flexible film is bent in such a way that the light-emitting surface and the first surface face each other.

The display unit may have flexibility.

The light-emitting surface may include a first light-emitting surface and a second light-emitting surface that are adjacent to each other and on opposite sides of a folding line, the second folding mode may include a portable folding mode and a normal folding mode, in the portable folding mode, the display unit may be bent at the folding line such that first light-emitting surface and the second light-emitting surface face each other with the drive unit therebetween, and in the normal folding mode, the first and second light-emitting surfaces may be substantially coplanar with one another with the folding line therebetween.

The drive unit may be covered by the first light-emitting surface or the second light-emitting surface in the portable folding mode.

The portable display device may be embodied in the first folding mode or the second folding mode according to whether the display unit is in use or not, and when the display unit is not in use, the portable display device may be embodied in the second folding mode.

When the display unit is in use, the portable display device may be embodied in the first folding mode.

The drive unit may include a battery that supplies power to the display unit through the flexible film.

The embodiments may be realized by providing a portable display device including a display unit, the display unit including a light-emitting surface displaying an image and a non-light-emitting surface opposite to the light-emitting surface; a control unit, the control unit controlling an operation of the display unit; a battery, the battery supplying power to the display unit and the control unit; a first flexible film, the first flexible film electrically connecting the display unit and the control unit; a second flexible film, the second flexible film electrically connecting the display unit and the battery; and a third flexible film, the third flexible film electrically connecting the control unit and the battery, wherein the control unit has a first surface on which the first flexible film is disposed, and a second surface opposite to the first surface, the battery has a third surface on which the second flexible film is disposed, and a fourth surface opposite the third surface, and the portable display device is embodied in a first folding mode in which the first and second flexible film are bent in such a way that the non-light-emitting surface and the second and fourth surfaces face each other, or a second folding mode in which the first and second flexible films are bent in such a way that the light-emitting surface and the first and third surfaces face each other.

The display unit may include a first substrate including the light-emitting surface; and a second substrate that includes the non-light-emitting surface, that supports the first substrate, and that includes a plurality of pixels generating the image, the first and second substrates may have flexibility.

One end of the first flexible film may be on the first surface and another end may be on the second surface, and one end of the second flexible film may be on the third surface and another end may be on the second surface.

One end of the third flexible film may be on the first surface and another end is on the third surface.

The light-emitting surface may include a first light-emitting surface and a second light-emitting surface that are adjacent to each other and on opposite sides of a folding line, and in the second folding mode, the portable display device may be in a normal folding mode or a portable folding mode.

In the portable folding mode, the display unit may be bent at the folding line such that first light-emitting surface and the second light-emitting surface face each other with the control unit therebetween.

In the normal folding mode, the first and second light-emitting surfaces may be substantially coplanar with one another with the folding line therebetween.

In the portable folding mode, the third flexible film may be bent inwardly in such a way that the control unit and the battery face each other.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
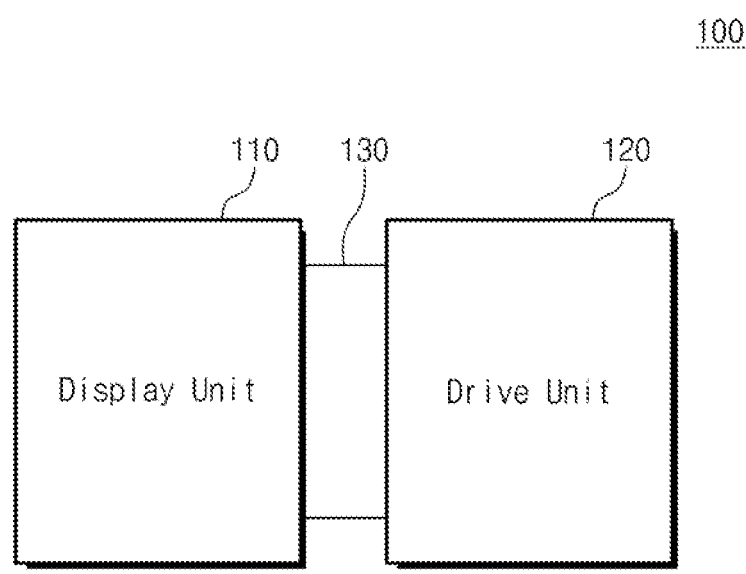
FIG. 1 illustrates a block diagram of a portable display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Terms "first", "second" and the like may be used to describe various elements, but the elements should not be construed as limited by the terms. The terms are only used for the purpose of discriminating one element from others. For example, without departing from the scope of claims of the present disclosure, "the first element" may be referred to as "the second elements", and vice versa. A singular expression contains a plural expression as long as they do not have clearly different meanings in the context.

In exemplary embodiments of the present disclosure, it should be understood that the term "include" or "have" is intended to specify that a feature, a number, a step, an operation, a component, a part or a combination thereof exists rather than to exclude in advance the possibility of existence or addition of one or more other features, numbers, steps, components, parts or combinations thereof.

FIG. 1 illustrates a block diagram of a portable display device according to an exemplary embodiment.

Referring to FIG. 1, the portable display device 100 may include a display unit 110, a drive unit 120, and a flexible film 130.

The display unit 110 may display an image to the outside under control of the drive unit 120. The display unit 110 and the drive unit 120 may be electrically connected through the flexible film 130. The drive unit 120 may provide a plurality of control signals and a plurality of video signals to the display unit 110 through the flexible film 130. The display unit 110 may display an image to the outside based on the control signals and the video signals provided by the drive unit 120.

In an implementation, the display unit 110 may be embodied as a display made of a flexible material. In an implementation, the display unit 110 may be bent or folded by an external action, e.g., the display unit 110 may be bendable or foldable. In an implementation, the display unit 110 may be embodied as various types of display devices, e.g., an organic light emitting display device, a liquid crystal display device, an electrowetting display device, a plasma display panel (PDP), or an electrophoretic display device.

Figure 2:
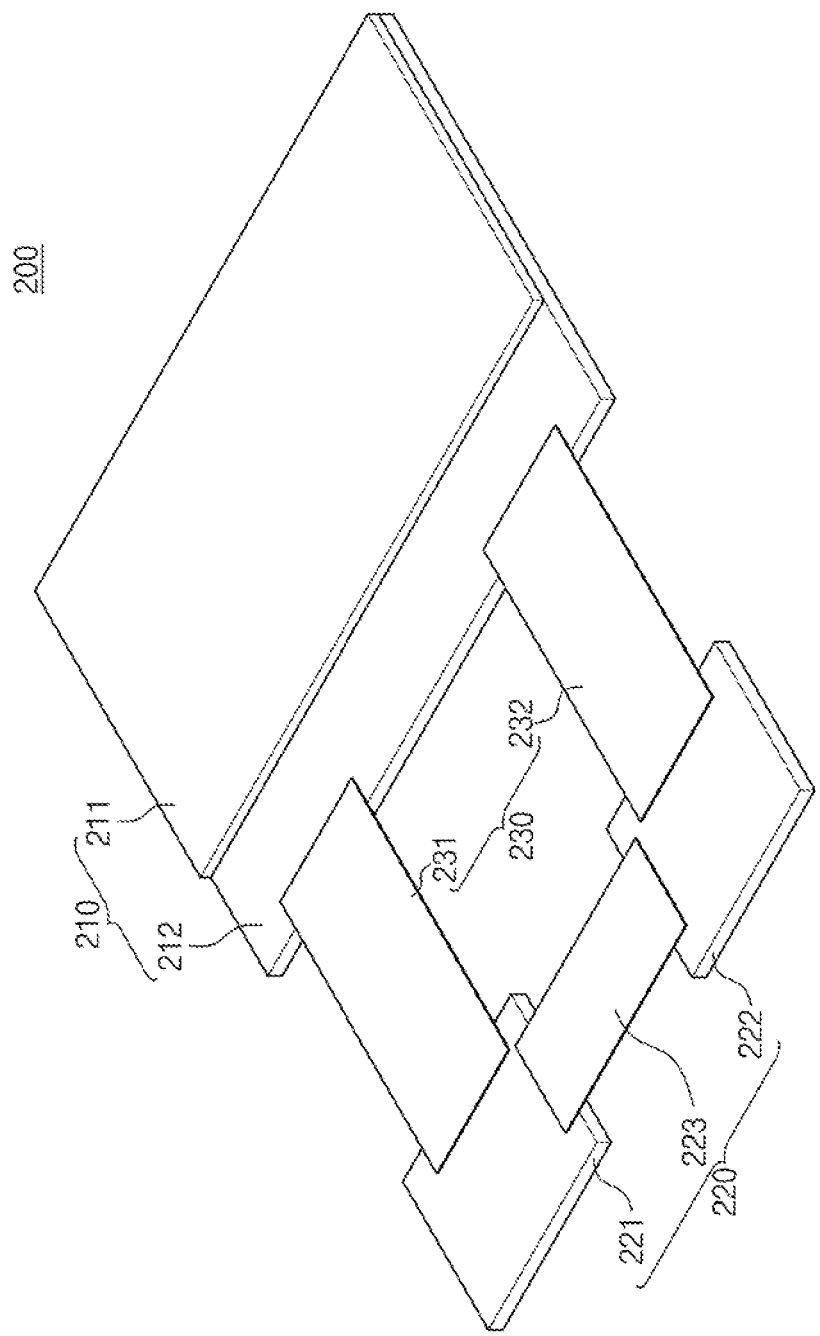
FIG. 2 illustrates a perspective view of a portable display device according to an embodiment.

FIG. 2 illustrates a perspective view of a portable display device according to an exemplary embodiment.

Referring to FIG. 2, the portable device 200 may include a display unit 210, a drive unit 220, and first and second flexible films 231 and 232.

The display unit 210 may include a first substrate 211 and a second substrate 212. In an implementation, the first substrate 211 and the second substrate 212 may each be formed of a flexible material and thus may have a bendable or foldable property, e.g., may be foldable or bendable.

The first substrate 211 may include a light-emitting surface that displays an image. The second substrate 212 may support the first substrate 211 and may include a non-light-emitting surface facing or opposite to the light-emitting surface of the first substrate 211. In an implementation, the second substrate 212 may generate an image under control of a control unit 221. For example, the display unit 210 may be embodied as a flexible display for displaying an image.

The second substrate 212 may include a plurality of gate lines, a plurality of data lines, and a plurality of pixels. The gate lines may extend in a row direction to cross the data lines extending in a column direction. The pixels may be connected to the corresponding gate lines and data lines, respectively.

For example, the control unit 221 may sequentially output gate signals to the gate lines. The pixels may be sequentially scanned row by row by the gate signals. The control unit 221 may output a plurality of data voltages converted based on the video signals. The pixels may receive the data voltages in response to the gate signals. In an implementation, the pixels may display, e.g., gray scales corresponding to the data voltages. For example, as the pixels display the gray scales corresponding to the data voltages, an image may be displayed to the outside through the light-emitting surface of the first substrate 211.

In an implementation, as described above, the control unit 221 may output the gate signals and data signals. In an implementation, the second substrate 212 may receive the control signals and the video signals from the control unit 221 and may generate the gate signals and the data signals.

The drive unit 220 may include, e.g., the control unit 221, a battery 222, and a third flexible film 223. The third flexible film 223 may electrically connect the control unit 221 and the battery 222.

The control unit 221 may be electrically connected to the second substrate 212 through the first flexible film 231. One end of the first flexible film 231 may be disposed on the second substrate 212 and another end may be disposed on the control unit 221. The control unit 221 may transfer, to the second substrate 212, the control signals and the video signals needed to display an image. The pixels included in the second substrate 212 may generate an image based on the control signals and the video signals transferred through the first flexible film 231. In an implementation, the control unit 221 may receive power from the battery 222 through the third flexible film 223.

The battery 222 may be electrically connected to the second substrate 212 through the second flexible film 232. One end of the second flexible 232 may be disposed on the second substrate 212 and another end may be disposed on the battery 222. The battery 222 may supply power needed to operate the pixels included in the second substrate 212. In an implementation, the battery 222 may supply power to the control unit 221 through the third flexible film 223. One end of the third flexible film 223 may be disposed on the control unit 221 and another end may be disposed on the battery 222.

In an implementation, the first to third flexible films 231, 232, and 233 may be formed to have a bendable or foldable property, e.g., may be flexible. As a result, e.g., as the first and second flexible films 231 and 232 are bent, the display unit 210 and the drive unit 220 may be folded to face each other.

Figure 3:
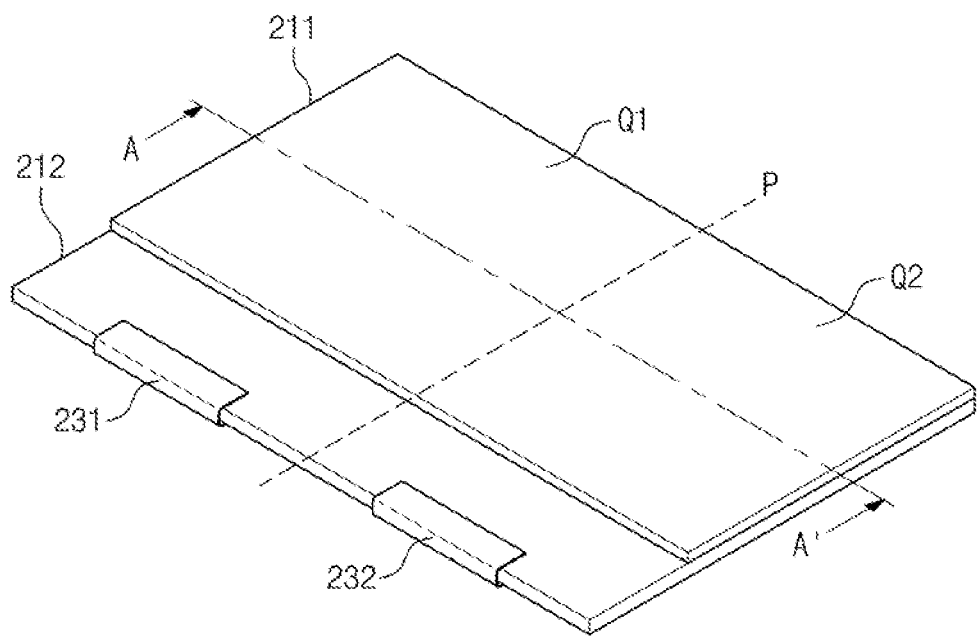
FIG. 3 illustrates a perspective view of the portable display device of FIG. 2 in a first folding mode.

FIG. 3 illustrates a perspective view of the portable display device of FIG. 2 in a first folding mode.

Referring to FIGS. 2 and 3, the portable display device 200 may be configured such that structures or positions of the display unit 210 and the drive unit 220 are diversely changed. For example, according to whether the portable display device 200 is in use or not, the structures or positions of the display unit 210 and the drive unit 220 may be changed. When the portable display device 200 is in use by a user, an image may be displayed through the light-emitting surface of the display unit 210. In this case, for a user's convenience, the portable display device 200 may be embodied in the first folding mode, in which the drive unit 220 is disposed to face the non-light-emitting surface of the display unit 210, e.g., is folded onto a back side of the portable display device 200.

For example, as illustrated in FIG. 3, in the first folding mode, the first flexible film 231 (electrically connecting the second substrate 212 and the control unit 221) may be bent toward or around the non-light-emitting surface of the second substrate 212. Accordingly, the control unit 221 may be disposed under the non-light-emitting surface of the second substrate 212, e.g., the control unit 221 and the non-light-emitting surface of the second substrate 212 may face each other. Likewise, in the first folding mode, the second flexible film 232 (electrically connecting the second substrate 212 and the battery 222) may be bent toward or around the non-light-emitting surface of the second substrate 212. Accordingly, the battery 222 may be disposed under the non-light-emitting surface of the second substrate 212, e.g., the battery 232 and the non-light-emitting surface of the second substrate 212 may face each other. Also, the third flexible film 223 (electrically connecting the control unit 221 and the battery 222) may be disposed under the non-light-emitting surface of the second substrate 212.

In an implementation, the first flexible film 231 and the second flexible film 232 may be individually or separately bent toward the bottom end of the non-light-emitting surface of the second substrate 212 when the portable display device 200 is in the first folding mode, or they may be bent simultaneously. For example, as the first flexible film 231 and the second flexible film 232 may be simultaneously bent toward the bottom or back end of the non-light-emitting surface of the second substrate 212, and the control unit 221 and the battery 222 may be simultaneously disposed under the non-emitting-surface of the second substrate 212.

Figure 4:
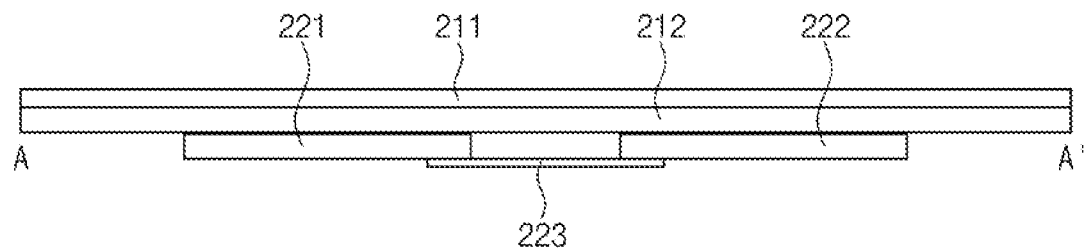
FIG. 4 illustrates a cross-sectional view taken along line A-A' in FIG. 3.

FIG. 4 illustrates a cross-sectional view taken along line A-A' in FIG. 3.

Referring to FIG. 2 through 4, when the portable display device 200 is in use, the first substrate 211 may be disposed at the uppermost position. As a result, an image may be visible to a user through the light-emitting surface of the first substrate 211. The second substrate 212 may be disposed under the first substrate 211 to output an image to or through the first substrate 211.

The control unit 221 and the battery 222 may be disposed under the second substrate 212 by the first and second flexible films 231 and 232. For example, the first and second flexible films 231, 232 may be simultaneously bent toward or around the non-light-emitting surface of the second substrate 212, and the control unit 221 and the battery 222 may be simultaneously disposed under the second substrate 212. In an implementation, as illustrated in FIG. 4, the control unit 221 and the battery 222 may contact the undersurface or back side of the second substrate 212. In an implementation, the first and second flexible films 231 and 232 may be bent, and the control unit 221 and the battery 222 may be spaced a predetermined distance from the undersurface of the second substrate 212.

The third flexible film 223 may be disposed under the control unit 221 and the battery 222 to electrically connect the control unit 221 and the battery 222 with each other.

Figure 5:
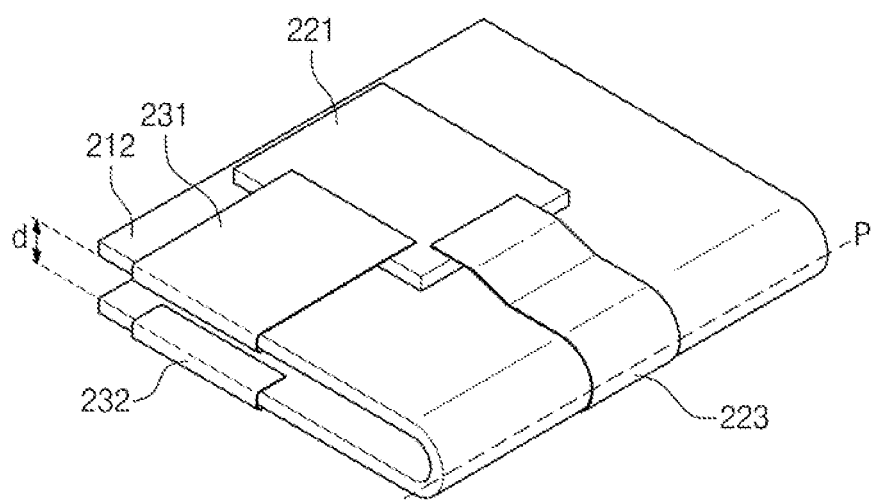
FIG. 5 illustrates a perspective view of a portable display device in a portable folding mode.

FIG. 5 illustrates a perspective view of a portable display device in a portable folding mode.

As described above, according to the portable folding mode, the portable display device 200 may be disposed in such a way that the drive unit 220 faces the non-light-emitting surface of the display unit 210. In this case, an image may be displayed to the outside through the light-emitting surface of the display unit 210. On the contrary, when the portable display device 200 is not in use by a user, an image may not be displayed through the light-emitting surface of the display unit 210. In this case, for enhancing user's convenience in portability, the portable display device 200 may be embodied in a portable folding mode. For example, after or when the portable display device 200 is in the first folding mode, the portable display device 200 may be embodied in the portable folding mode according to whether the portable display device 200 is in use or not.

For example, referring to FIGS. 3 and 5, in the portable folding mode, the portable display device 200 may be folded with respect to or about a folding line P when the portable display device 200 is in the first folding mode in such a way that a first light-emitting surface Q1 and a second light-emitting surface Q2 (adjacent thereto) face each other. For example, the first light-emitting surface Q1 and the second light-emitting surface Q2 may be folded to face each other, and may not contact each other. For example, the first and second substrates 211 and 212 of the display unit 210 may have a bendable or foldable property. However, due to a radius of curvature of elements themselves, the first and second substrates 211 and 212 may be folded with respect to the folding line P to still be spaced apart from each other by a predetermined distance.

However, in the portable folding mode, the drive unit 220 may be bent with respect to or about the folding line P to face the display part 210 located inside thereof, and thus the thickness of the portable display device 200 could become larger. If the thickness of the portable display device 200 were to become larger, convenience in portability could worsen.

According to an exemplary embodiment, in the portable folding mode, the display unit 210 may be bent with respect to or about the folding line P to face the drive unit 220 located inside thereof, e.g., such that the drive unit 220 is folded inside or within the display unit 210. Thus, the thickness of the portable display device 200 may become smaller. Accordingly, convenience in portability may be improved. With regard to this, a detailed description will be given below with reference to FIGS. 6 and 7.

Figure 6:
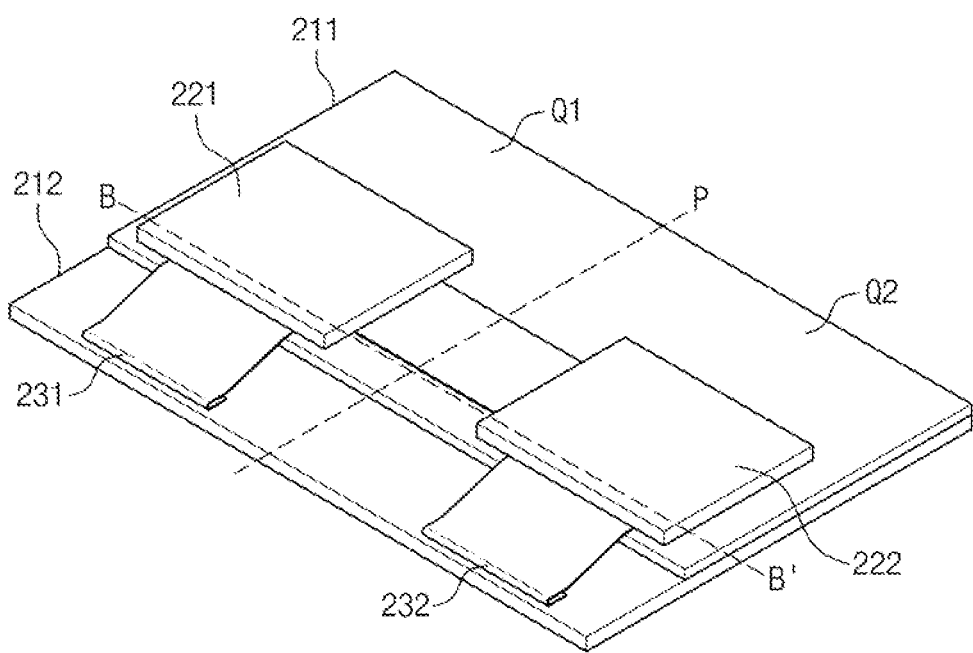
FIG. 6 illustrates a perspective view of the portable display device of FIG. 2 in a second folding mode.

FIG. 6 illustrates a perspective view of the portable display device of FIG. 2 in a second folding mode, e.g., a normal folding mode of the second folding mode.

Referring to FIGS. 2 and 6, when the portable display device 200 is not in use by a user, an image may not be displayed through the light-emitting surface of the display unit 210. In this case, for user's convenience, the portable display device 200 may be embodied in the second folding mode, in which the drive unit 220 is disposed to face the light-emitting surface of the display unit 210.

For example, as illustrated in FIG. 6, in the second folding mode, the first flexible film 231 (electrically connecting the second substrate 212 and the control unit 221) may be bent toward or around the light-emitting surface of the first substrate 211. Accordingly, the control unit 221 may be disposed on top of the light-emitting surface of the first substrate 211. In an implementation, in the second folding mode, the second flexible film 232 (electrically connecting the second substrate 212 and the battery 222) may be bent toward or around the light-emitting surface of the first substrate 211. Accordingly, the battery 222 may be disposed on top of the light-emitting surface of the first substrate 211. In an implementation, the third flexible film 223 (electrically connecting the control unit 221 and the battery 222) may be disposed on top of the light-emitting surface of the first substrate 211.

In an implementation, the first flexible film 231 and the second flexible film 232 may be individually or separately bent toward the top end of the light-emitting surface of the first substrate 211 during or when the portable display device 200 is in the second folding mode, or they may be bent simultaneously. For example, the first and second flexible films 231 and 232 may be simultaneously bent toward or over the top end of the light-emitting surface of the first substrate 211, and thus the control unit 221 and the battery 222 may be simultaneously disposed on top of the light-emitting surface of the second substrate 211.

For example, the portable display device 200 according to an embodiment is operable, movable, or reconfigurable between the first folding mode (as illustrated in FIG. 3) and the second folding mode (as illustrated in FIG. 6).

Figure 7:
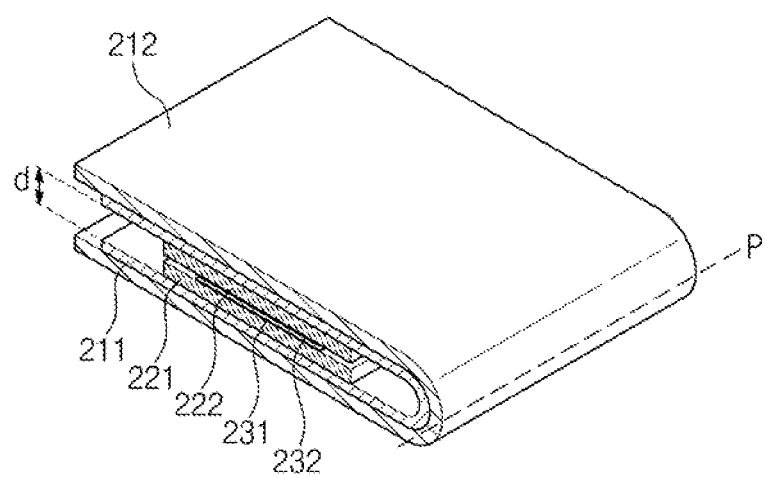
FIG. 7 illustrates a cross-sectional perspective view of a portable display device in a portable folding mode, which is taken along line B-B' in FIG. 6.

FIG. 7 illustrates a cross-sectional perspective view of a portable display device in a portable folding mode, e.g. a portable folding mode of the second folding mode, which is taken along line B-B' in FIG. 6.

As described in detail through FIG. 6, when the portable display device 200 is in the second folding mode, the drive unit 220 may be disposed to face or cover the light-emitting surface of the display unit 210. For example, when the portable display device 200 is not in use by the user, an image may not be displayed through the light-emitting surface of the display unit 210. Accordingly, for convenience in portability, an operation may be performed to minimize the overall size of the portable display device 200. According to an exemplary embodiment, for convenience in portability, the portable display device 200 may be embodied in the portable folding mode or a normal folding mode.

For example, referring to FIGS. 6 and 7, in the portable folding mode, the portable display device 200 may be folded with respect to or about a folding line P in such a way that a first light-emitting surface Q1 and a second light-emitting surface Q2 (adjacent to the first light-emitting surface Q1) face each other. In this case, although the first light-emitting surface Q1 and the second light-emitting surface Q2 are folded to face each other, they may not contact each other. For example, the first and second substrates 211 and 212 of the display unit 210 may have a bendable or foldable property. However, due to a radius of curvature of elements themselves, the first and second substrates 211 and 212 may be folded with respect to or about the folding line P to be spaced apart from each other by a certain distance. As a result, as illustrated in FIG. 7, the first light-emitting surface Q1 and the second light-emitting surface Q2 may be folded to be spaced apart from each other by a predetermined distance d.

When the portable display device 200 is in the second folding mode (in which the drive unit 220 is disposed on top of the light-emitting surface of the display unit 210), the drive unit 220 may be disposed within or between the spaced apart first light-emitting surface Q1 and second light-emitting surface Q2 when the portable display device 200 is in the portable folding mode. When the first light-emitting surface Q1 and the second light-emitting surface Q2 (adjacent thereto) are folded with respect to the folding line P to face each other, a first surface of the control unit 221 may be disposed to face the first light-emitting surface Q1. A second surface (opposite to the first surface of the control unit 221) may be disposed to face the battery 222. Additionally, when the first light-emitting surface Q1 and the second light-emitting surface Q2 (adjacent thereto) are folded with respect to the folding line P to face each other, a first surface of the battery 222 may be disposed to face the second light-emitting surface Q2. Also, a second surface (opposite to the first surface of the battery 222) may be disposed to face the control unit 221. The third flexible film 223 may be bent with respect to the folding line P in such a way that the control unit 221 and the battery 222 face each other.

In an implementation, when the portable display device 200 is in the normal folding mode, the first light-emitting surface Q1 and the second light-emitting surface Q2 (adjacent thereto) may be disposed in parallel or substantially coplanar with each other with respect to the folding line P, e.g., with the folding line P therebetween. For example, the normal folding mode may be embodied in a parallel configuration in which the first light-emitting surface Q1 and the second light-emitting surface Q2 are not folded about the folding line P, as illustrated in FIG. 6.

According to above detailed descriptions, in the portable folding mode, the portable display device 200 may be embodied as a structure, in which the display unit 210 is folded with the drive unit 220 located inside thereof. As a result, the total thickness of the portable display device 200 may decrease.

Figure 8:
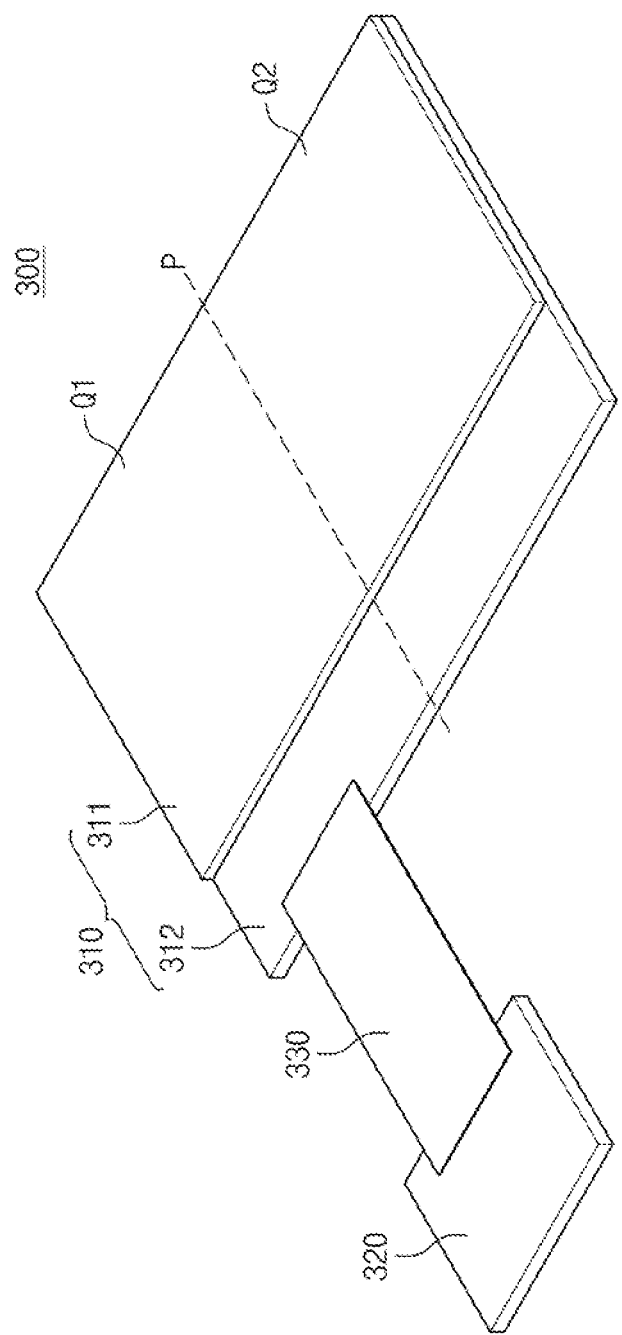
FIG. 8 illustrates a perspective view of a portable display device according to another embodiment.

FIG. 8 illustrates a perspective view of a portable display device according to another embodiment.

Referring to FIG. 8, the portable display device 300 may include a display unit 310, a drive unit 320 and a flexible film 330. The display unit 310 may include a light-emitting surface (for displaying an image) and a non-light-emitting surface (opposite to the light-emitting surface). The light-emitting surface may be included in a first substrate 311, and the non-light-emitting surface may be included in a second substrate 312. In an implementation, the light-emitting surface may be divided into or may include a first light-emitting surface Q1 and a second light-emitting surface Q2, which are adjacent to each other with respect to or on opposite sides of a folding line P. In an implementation, in the portable folding mode, the drive unit 320 may be covered by the first light-emitting surface Q1 or the second light-emitting surface Q2, e.g., may be between the first light-emitting surface Q1 and the second light-emitting surface Q2. For example, the drive unit 320 may be included inside the display unit 310 in the portable folding mode.

Furthermore, the portable display device 300 illustrated in FIG. 8 may be embodied in such a way that the battery is included in the drive unit 320, in comparison with the portable display device 200 illustrated in FIG. 2. For example, in the portable display device 200 illustrated in FIG. 2, the battery and the control unit may be connected with the display unit through the flexible films, respectively. However, in the portable display device 300 illustrated in FIG. 8, the display unit 310 and the drive unit 320 may be electrically connected with each other through a single flexible film 330.

Additionally, according to an exemplary embodiment, the portable display device 300 may be embodied in the first and second folding modes, and the portable and normal folding modes, as illustrated in FIGS. 3, 6 and 7. The method of realizing each folding mode is the same as those described with reference to FIGS. 3, 6 and 7, and thus repeated descriptions thereof may be omitted herein.

By way of summation and review, a portable display device may include a display unit (displaying an image), and may provide a satellite broadcasting service or other multimedia services through the display unit.

Additionally, portable display devices that are smaller, slimmer, and more lightweight have been considered. For example, portable display devices, may be formed of a flexible material and may be able to be bent or folded.

The embodiments may provide a flexible or bendable portable display device.

According to exemplary embodiments, a portable display device, which is able to be bent and folded, may be provided to enhance convenience.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A portable display device, comprising:
a display unit including a light-emitting surface that displays an image and a non-light-emitting surface opposite to the light-emitting surface, the light-emitting surface including a first light-emitting surface and a second light-emitting surface that are continuously disposed on a first substrate and are on opposite sides of a folding line;
a drive unit external to the display unit and controlling the display unit; and
a flexible film electrically connecting the display unit and the drive unit, the flexible film extending from the display unit in a direction parallel with the folding line in an unfolded state,
wherein the drive unit includes:
a first surface on which the flexible film is disposed, and
a second surface opposite to the first surface,
wherein the portable display device is embodied in:
a folding mode in which the flexible film is bent in such a way that the light-emitting surface and the first surface face each other,
wherein the drive unit does not overlap the display unit in the unfolded state,
wherein the folding mode includes a portable folding mode and a normal folding mode,
wherein in the portable folding mode, the display unit is bent at the folding line such that first light-emitting surface and the second light-emitting surface face each other with the drive unit therebetween, and
wherein in the normal folding mode, the first and second light-emitting surfaces are substantially coplanar with one another with the folding line therebetween.

2. The portable display device as claimed in claim 1, wherein the display unit has flexibility.

3. The portable display device as claimed in claim 1, wherein the drive unit is covered by the first light-emitting surface or the second light-emitting surface in the portable folding mode.

4. The portable display device as claimed in claim 1, wherein:

when the display unit is not in use, the portable display device is embodied in the folding mode.

5. The portable display device as claimed in claim 1, wherein the drive unit includes a battery that supplies power to the display unit through the flexible film.

6. The portable display device as claimed in claim 1, wherein the flexible film is foldable about a folding line of the flexible film that is perpendicular to the folding line of the display unit.

7. A portable display device, comprising:
a display unit including a light-emitting surface displaying an image and a non-light-emitting surface opposite to the light-emitting surface, the light-emitting surface including a first light-emitting surface and a second light-emitting surface that are continuously disposed on a first substrate and are on opposite sides of a folding line;
a control unit external to the display unit and controlling an operation of the display unit;
a battery supplying power to the display unit and the control unit;
a first flexible film, electrically connecting the display unit and the control unit;
a second flexible film electrically connecting the display unit and the battery, the first flexible film and the second flexible film extending from the display unit in a direction parallel with the folding line in an unfolded state; and
a third flexible film electrically connecting the control unit and the battery,
wherein:
the control unit has a first surface on which the first flexible film is disposed, and a second surface opposite to the first surface,
the battery has a third surface on which the second flexible film is disposed, and a fourth surface opposite the third surface,
the portable display device is embodied in:
a folding mode in which the first and second flexible films are bent in such a way that the light-emitting surface and the first and third surfaces face each other,
the control unit and the battery supplying do not overlap the display unit in the unfolded state,
in the folding mode, the portable display device is in a normal folding mode or a portable folding mode, and
in the portable folding mode, the display unit is bent at the folding line such that first light-emitting surface and the second light-emitting surface face each other with the control unit therebetween.

8. The portable display device as claimed in claim 7, wherein:
the display unit includes:
the first substrate including the light-emitting surface; and
a second substrate that includes the non-light-emitting surface, that supports the first substrate, and that includes a plurality of pixels generating the image,
the first and second substrates have flexibility.

9. The portable display device as claimed in claim 8, wherein:
one end of the first flexible film is on the first surface and another end is on the second surface, and
one end of the second flexible film is on the third surface and another end is on the second surface.

10. The portable display device as claimed in claim 7, wherein one end of the third flexible film is on the first surface and another end is on the third surface.

11. The portable display device as claimed in claim 7, wherein, in the normal folding mode, the first and second light-emitting surfaces are substantially coplanar with one another with the folding line therebetween.

12. The portable display device as claimed in claim 7, wherein in the portable folding mode, the third flexible film is bent inwardly in such a way that the control unit and the battery face each other.

13. The portable display device as claimed in claim 7, wherein the first flexible film and the second flexible film are foldable about folding lines thereof, the folding lines of the first flexible film and the second flexible film being perpendicular to the folding line of the display unit.

14. A portable display device, comprising:
- a display unit including a light-emitting surface that displays an image and a non-light-emitting surface opposite to the light-emitting surface, the light-emitting surface including a first light-emitting surface and a second light-emitting surface that are continuously disposed on a first substrate and are on opposite sides of a folding line;
- a drive unit external to the display unit and controlling the display unit; and
- a flexible film electrically connecting the display unit and the drive unit, the flexible film extending from the display unit in a direction parallel with the folding line in an unfolded state, wherein the drive unit includes:
a first surface on which the flexible film is disposed, and
a second surface opposite to the first surface,
wherein the portable display device is folded in one of a first folding mode in which the flexible film is bent in such a way that the non-light-emitting surface and the second surface face each other, and a second folding mode in which the flexible film is bent in such a way that the light-emitting surface and the first surface face each other,
wherein in the second folding mode, the display unit is bent at the folding line such that first light-emitting surface and the second light-emitting surface face each other with the drive unit therebetween
wherein in the first folding mode, the first and second light-emitting surfaces are substantially coplanar with one another with the folding line therebetween, and
wherein the drive unit does not overlap the display unit in the unfolded state.

* * * * *